March 23, 1943.  E. D. DAHLMAN  2,314,773
VINE PULLING MACHINE
Filed Feb. 25, 1942
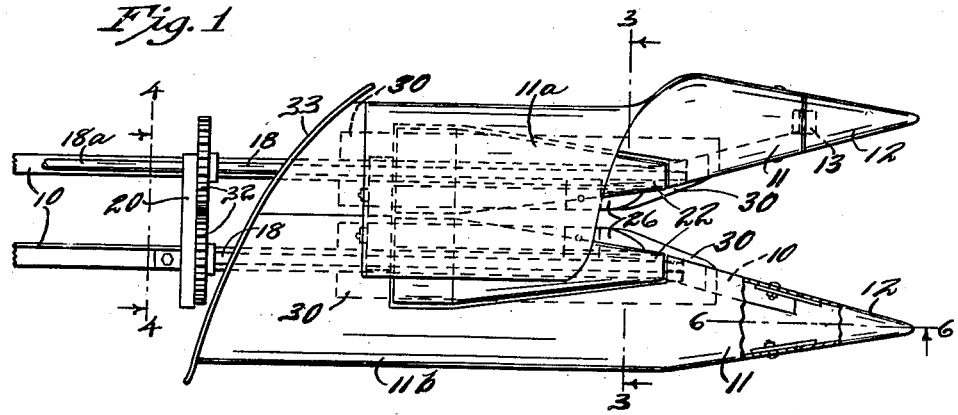
Fig. 1
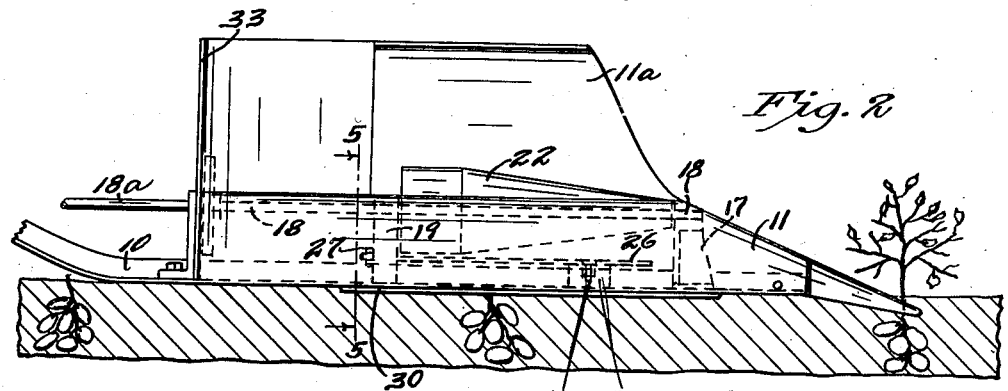
Fig. 2
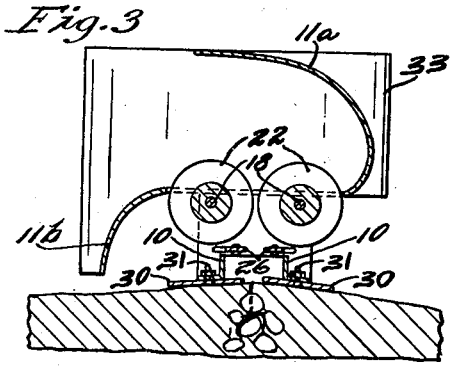
Fig. 3
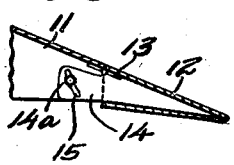
Fig. 6.
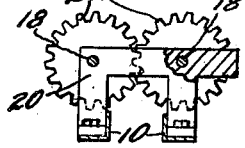
Fig. 4.
Fig. 5
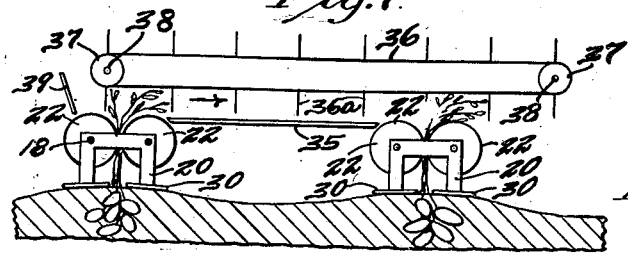
Fig. 7
Inventor
Eben D. Dahlman
By Chas. C. Reif
Attorney Patented Mar. 23, 1943

2,314,773

UNITED STATES PATENT OFFICE 2,314,773

VINE PULLING MACHINE

Eben D. Dahlman, Grandy, Minn.

Application February 25, 1942, Serial No. 432,267

7 Claims. (Cl. 55—66)

This invention relates to a vine pulling machine and particularly to a machine for pulling potato vines. In harvesting potatoes it has heretofore been the practice to lift the potatoes and vines by means of a digger and picker, the potatoes then being delivered to the packing apparatus which usually sorts and bags the same. At the time the potatoes are dug the vines are usually present and these are quite strong and tough. The vines are lifted and passed into the picker mechanism where they tend to clog the machinery and interfere with the operation thereof.

It is an object of this invention to provide a simple and efficient device which may be used on the potato patch or field to remove the vines before the potatoes are lifted or harvested.

It is a further object of the invention to provide such a machine having means adapted to travel at either side of the row of vines for guiding the vines to a pair of rotating rollers which grip and lift the vines together with means between which the vines must pass before removing any potatoes therefrom.

It is a further object of the invention to provide a simple and efficient machine for lifting the potato vines, separating the potatoes therefrom together with means for discharging the vines at one side of the machine.

It is more specifically an object of the invention to provide a machine having forward members of conical and substantially pointed form adapted to travel adjacent the surface of the ground at either side of the row of vines together with guide means extending rearwardly from said members, cooperating with guide plates to guide the vines between a pair of rotating rollers which lift the vines, spaced means being provided between which the vines are pulled upwardly to separate the potatoes therefrom, said last mentioned means being adjustable and means being provided to hold said first mentioned members in various positions.

These and other objects and advantages of the invention will be fully set forth in the following description made in connection with the accompanying drawing in which like reference characters refer to similar parts throughout the several views and in which:

Fig. 1 is a plan view of the machine;

Fig. 2 is a view in side elevation as seen from the bottom of Fig. 1;

Fig. 3 is a vertical section taken on line 3—3 of Fig. 1 as indicated by the arrows;

Fig. 4 is a vertical section taken on line 4—4 of Fig. 1, some parts being broken away and others shown in vertical section;

Fig. 5 is a vertical section taken on line 5—5 of Fig. 2;

Fig. 6 is a vertical section taken on line 6—6 of Fig. 1 as indicated by the arrow; and Fig. 7 is a view in end elevation of rather diagrammatic type shown illustrating a modified form of machine.

Referring to the drawing a machine is shown having a frame comprising longitudinally extending substantially parallel frame members 10. While these could be of various forms, in the embodiment of the invention illustrated they are shown as in the form of angle bars having their angles directed away from each other. At their forward ends these members 10 are bent to diverge and have secured thereto a pair of fructo conical members 11. Members 11 are flattened at their bottom sides and these members will preferably be formed of sheet metal. The plates forming members 11 extend rearwardly and are substantially horizontal adjacent a line disposed over and parallel with the longitudinal axes of members 11. A pair of conical members 12 are disposed forwardly of members 11 having their surfaces flush with and forming continuations of the surfaces of members 11. Members 12 are substantially pointed at their forward ends and are connected to members 11 by hinges 13 so that they may swing upwardly and downwardly. Plates 14 are secured to the sides of member 12 in any suitable manner as by welding, which plates extend rearwardly in members 11 and are provided with arcuate slots 14a through which pass headed and nutted bolts 15 secured in members 12. When members 12 are swung about the hinges 13 bolts 15 will be aligned and will be positioned at different places in the slots 15a. By tightening bolts 15 members 12 may be held in different positions. Some distance rearwardly of the front ends of members 11 standards 17 are secured to and upstand from frame members 10. Members 17 are provided with upper bearing portions in which are journaled the front ends of shafts 18. Said shafts are also journaled in a vertically extending block or plate 19 secured to and upstanding from members 10 quite a distance rearwardly of standards 17. Said shafts 18 are also journaled in a bracket 20 also secured to and upstanding from members 10 rearwardly of plate 19. Each shaft 18 has secured thereto a roller 22, said roller being of frusto-conical form at its forward end and having a rear cylindrical portion. The bracket 19 is provided with a slot 19b and a block 23 engages one of the shafts 18 and is engaged by one end of a compression coiled spring 24, the other end of which engages the end of slot 19b. Said shaft 18 and the roller 22 carried thereby will thus be resiliently urged toward the other roller 22. Said shaft 18 will be somewhat flexible to permit some movement. The rollers 22 have thus some movement toward and from each other and are resiliently held in close proximity. Beneath rollers 22 are disposed a pair of guide plates 26. Said plates are provided with threaded projections which extend through slots 19a and receive nuts 27. Said plates at their forward ends are disposed on plates 28 carried at the top of frame members 10 and are secured thereto by bolts 29. Plates 26 have spaced substantially parallel edges at their rear portions. Said edges diverge at their front portions and come into substantial alignment with the surfaces of members 11. A pair of plates 30 are secured to frame members 10 and these plates are of general rectangular form except that their front portions are of somewhat trapezoidal shape having diverging edges. Plates 30 are adjustable toward and from each other and carry bolts 31 which will be movable in slots in the horizontal flanges of frame members 10. Shafts 18 have secured thereto adjacent bracket 20 gears 32 shown as of the same diameter and meshing with each other. One shaft 18 is continued rearwardly as shown at 18a and will be rotated by some suitable source of power.

The plate forming one member 11 is curved upwardly rearwardly of said member and extends reversely over the rollers 22, the reversely curved member being designated 11a. The plate forming the other member 11 rearwardly of said front frusto conical portion of said member is bent outwardly and downwardly as shown at 11b. A rear plate 33 is provided which extends substantially vertically from the plates forming members 11 at the horizontal rear portion thereof, said plate 33 being curved to extend at an angle toward the side 11b. It will be understood that the plates forming members 11 at their rear portions are cut away to accommodate the upper portions of rollers 22 as clearly shown in Fig. 1.

In operation the machine will be pushed forwardly by a truck, tractor or similar power unit which will supply power to shaft 18a and will be suitably connected to the frame members 10. The front members 12 will extend downwardly as shown in Fig. 2 and will move adjacent the surface of the ground, preferably somewhat beneath said surface. It will be noted that the members 11, 12, 26, 30 and the rollers 22 are disposed symmetrically at either side of a central longitudinal line of the machine. The members 12 will pass at each side of the row of vines at substantially equal distances therefrom. As the machine moves forwardly the vines will be lifted up by members 12 and will engage the sides of said members as well as the sides of the frusto conical guide members 10. The vines will be engaged by the rearwardly converging edges of plates 26 and 30 and will be guided by these plates between the rollers 22 which will be rotating upwardly toward each other so as to grip and move the vines upwardly. As the vines move rearwardly toward the rollers they will thus be gripped and pulled upwardly by the rollers. The members 30 are provided and so spaced as to engage any potatoes which might be pulled upwardly with the vines and separate the same from the vines so that no potatoes will pass said plates 30. As the vines are discharged upwardly above rollers 22 they pass onto the plates forming members 11 and will be moved toward the side having plate portion 11b by the curved formation of said plate and plate 33 so that the vines will be discharged over the outwardly and downwardly curved side 11b. It will be readily understood that the forward motion of the vehicle will cause the vines to slide over the plates and be discharged. The operation of the machine is quite rapid and the troublesome vines are thus quickly cleared out of the way so that the potatoes can be then harvested. Much time will be saved by getting rid of the troublesome vines so that they will not be clogging the picker so that an operator will not have to devote his time to separating and pulling the vines off of the picker.

In Fig. 7 a structure of a twin machine is indicated which will comprise two machines having the rollers 22, the brackets 17, 19 and 20 as well as the plates 30. A platform 35 will be provided between the pairs of rollers 22 and an endless conveyor 36 having propelling blades 36a will move over platform 35, the lower run thereof moving in the direction indicated by the arrow to move the vines to one side and discharge the same. Conveyor 36 is shown of the belt type running over rollers 37 at each end thereof carried on shafts 38. One of the shafts 38 can be driven in any suitable manner from one of the shafts 18. A plate 39 is shown extending upwardly and outwardly from one of the rollers 22 at the side of the machine opposite to that at which the vines are discharged. It will be seen that the operation of the device shown in Fig. 7 will be similar to that already described except that when the vines are moved above the rollers 22 they will be engaged by conveyor 36 and discharged thereby.

From the above description it will be seen that I have provided a simple and efficient machine for pulling and discharging the potato vines so that they will not be in the way and be troublesome in the subsequent harvesting of the potatoes. The machine can be made at comparatively small expense and will need only one operator. The operation of the machine is quite rapid and it will prove a great time and labor saver in the harvesting of the potatoes. It is apparent that the device will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A device for pulling and discharging potato vines having in combination, a pair of laterally spaced conical members having forward substantially pointed ends and having rearwardly converging sides, spaced guide members extending rearwardly from said first mentioned members, a pair of laterally spaced rollers between which the vines are guided, said conical members having their central axes inclining downwardly from said rollers so that the pointed ends thereof are disposed closely adjacent or beneath the surface of the ground and closely spaced means below said guiding means and rollers between which the vines must move upwardly, said means being constructed and arranged to separate the potatoes from said vines.

2. A device for pulling and discharging potato vines having in combination, a pair of laterally spaced conical members having forward substantially pointed ends adapted to move beneath or adjacent the surface of the ground thus having rearwardly converging sides, guide members of general frusto conical shape extending rearwardly from said members and having their surfaces substantially flush with the surfaces thereof, spaced guide plates between which said vines move, laterally spaced rollers between which the vines are guided by said plates and guide members and a pair of spaced members below said guide means between which the vines are pulled upwardly by said rollers to free the potatoes therefrom.

3. A device for pulling and discharging potato vines having in combination, a pair of laterally spaced substantially pointed members, guide means extending rearwardly from said members, said members and means having rearwardly converging adjacent sides, laterally spaced guide plates extending rearwardly from said guide means, a pair of laterally spaced rollers between which the vines are guided, said vines, guide means, plates and rollers being disposed symmetrically about the longitudinal center line of said device, and a pair of laterally spaced plates below said guide plates between which the vines are pulled upwardly by said rollers to free potatoes therefrom.

4. A device for pulling and discharging potato vines having in combination, a pair of laterally spaced members adapted to move at either side of a row of vines and having rearwardly converging adjacent sides, a pair of laterally spaced rollers between which vines are guided, a plate extending at the outer sides of said rollers in a substantially horizontal plane, said plate at one side being curved upwardly and reversely over said rollers and said plate at the other side being curved outwardly and downwardly, a substantially vertical plate in the rear of said rollers extending diagonally toward said last mentioned side whereby the vines discharged upwardly from said rollers will be moved by said plates and be discharged over said outwardly and downwardly curved side of said first mentioned plate.

5. A device for pulling and discharging potato vines having in combination, a pair of laterally spaced conical members having forwardly substantially pointed ends adapted to move adjacent or beneath the surface of the ground at either side of a row of vines, said members being movable vertically, means for holding said members in different positions, guide means having rearwardly converging adjacent portions, a pair of laterally spaced rollers between which the vines are guided, means for rotating said rollers to pull said vines upwardly and means for discharging said upwardly pulled vines at one side of said device.

6. A device for pulling and discharging potato vines having in combination, a pair of laterally spaced substantially pointed members adapted to move at either side of a row of vines with their forward ends adjacent or beneath the surface of the ground, guide means in the rear of said members respectively having laterally converging adjacent portions, a pair of laterally spaced rollers between which the vines are guided by said members and guide means, means for rotating said rollers to pull said vines upwardly and spaced means between which said vines are pulled for separating any potatoes which might be attached to said vines.

7. The structure set forth in claim 6, said last mentioned means comprising spaced plates and means for holding said plates in different positions to vary the space therebetween.

EBEN D. DAHLMAN.